United States Patent [19]

Roch

[11] 4,427,544

[45] Jan. 24, 1984

[54] MAGNETO ELECTROCHEMICAL REACTOR

[76] Inventor: Ricardo Roch, 2138 Biscayne Blvd., Suite 204, Miami, Fla. 33137

[21] Appl. No.: 292,056

[22] Filed: Aug. 12, 1981

Related U.S. Application Data

[63] Continuation-in-part of Ser. No. 139,180, Apr. 11, 1980, abandoned.

[51] Int. Cl.³ ............................................. C02F 1/48
[52] U.S. Cl. ..................................... 210/222; 290/43; 204/302
[58] Field of Search ............... 210/222, 223, 343, 695; 204/299, 302, 155, 149; 174/152 R; 310/178, 11; 290/43

[56] References Cited

U.S. PATENT DOCUMENTS

| | | | |
|---|---|---|---|
| 2,732,943 | 1/1956 | Hagberg | 210/223 |
| 3,441,502 | 4/1969 | Tenorio | 210/695 |
| 3,819,515 | 6/1974 | Allen | 210/222 |
| 4,151,090 | 4/1979 | Fava | 210/222 |
| 4,226,720 | 10/1980 | Brigante | 210/222 |
| 4,288,323 | 10/1981 | Brigante | 210/222 |
| 4,312,123 | 1/1982 | Wheeler | 174/152 R |

Primary Examiner—Peter A. Hruskoci
Assistant Examiner—Sharon T. Cohen
Attorney, Agent, or Firm—Jesus Sanchelima

[57] ABSTRACT

A magneto-electrochemical reactor for the treatment of water comprising a non-magnetic conduit provided with an inlet and outlet and a hydro-magnetic homopolar generator including a ferromagnetic armature centrally disposed inside said conduit and adapted to rotate with the fluid flow and generate an electric current by cutting a magnetic field with said armature. The current generated produces ferrous ferric oxide which offers a preferential surface for deposition of scaling forming cations such calcium and magnesium, and further, by forming a protective ferrous film on the heat transfer surfaces being protected.

2 Claims, 2 Drawing Figures

4,427,544

MAGNETO ELECTROCHEMICAL REACTOR

BACKGROUND OF THE INVENTION

1. Related prior applications

This application is a continuation-in-part of my prior application Ser. No. 139,180, filed Apr. 11, 1980, now abandoned, and entitled Electromagnetic Fluid Conditioner.

2. Field of the Invention

The present invention relates to a magneto-electrochemical reactor for the treatment of water, and more particularly, to a reactor provided with a homopolar generator capable of maximizing electric current intensity with a given flow rate and electromagnetic field.

3. Description of the Prior Art

Several attempts have been made in the past to treat water for the prevention of scaling and corrosion, however, none of these attempts have successfully and reliably solved this problem.

One of these attempts is disclosed in U.S. Pat. No. 4,226,720 issued to Miguel F. Brigante. Basically, this device is not a homopolar generator and the low electric field being generated, even though the patentee apparently does not know of its existence, by its propeller is not enough to generate sufficient hydrated ferrous oxide that is required to produce the needed bulk precipitation of the scaling cations, such as calcium and magnesium. Furthermore, it is submitted that the specification in this patent is erroneous in that it states that the purpose of the helical impeller is to sweep in a broom fashion the inner wall free from particles which tend to deposit on the wall. See Column 3, line 30 and 31, column 2, lines 41 and 42. If this mechanical function is the purpose of this invention, there is no apparent need for a magnetic field. The patentee goes further to state that a high flux density and field intensity surrounding the blades of the impeller is created but he does not explain or discuss the purpose of this field, which is presumed to be a magnetic field induced from the DC energized coil 51.

In the following paragraphs, the applicant herein, who has many years of experience in this field, will explain in detail the hereinsofar unexplained principle which causes the much desired precipitation of the scaling cations, and furthermore, the present invention is an improvement and more efficient device for achieving this purpose.

Other patents describing the closest subject matter provide for a number of more or less complicated features that fail to solve the problem in an efficient and economical way. None of these patents suggest the novel features of the present invention.

OBJECTS OF THE INVENTION

It is the main object of the present invention to provide a reactor for the treatment of fluids, and in particular water, capable of combining the effect of electric and magnetic fields in a conduit so that an optimum electrochemical reaction is achieved generating synthetic magnetite and thereby inducing a heterogenous crystallization of the cations contained in said fluid.

It is another object of the present invention to provide a compact mechanism that may be readily installed and serviced as a water treatment device to prevent scaling on heat transfer surfaces.

It is yet another object of the present invention to provide a homopolar generator capable of enhancing the electro-generation of iron hydroxide which acts as nucleation seeds for inducing bulk precipitation of the cations in the whole volume of the fluid.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figures 1, 2:
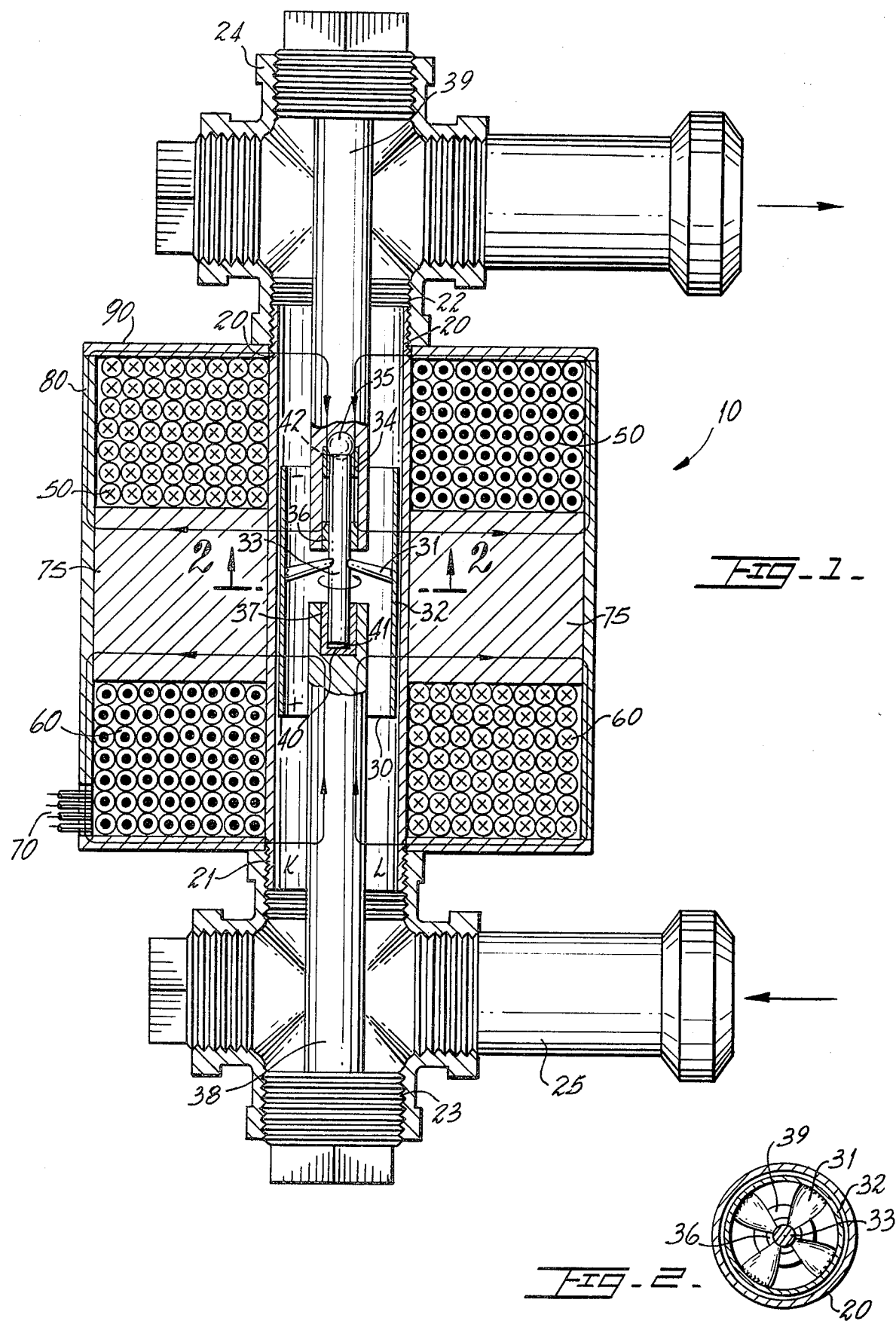
FIG. 1 is a cross-section of the present invention showing the preferred embodiment and the respective polarizations of the electric and magnetic fields generated.
FIG. 2 is a detailed view of the spider turbine assembly.

Referring to FIG. 1, wherein the present reactor device is generally referred to as numeral 10, it may be observed that the invention, in the preferred embodiment, is implemented in a section of a non-magnetic conduit 20 having coils 50 and 60 wound over it, which are usually enclosed by a housing (not shown). The device may be installed as a module in any water feeding lines to heat exchangers which are susceptible to scaling and corrosion. Sectional conduit 20 is provided with threads 21 and 22 at their inlet and outlet outer walls of conduit 20, respectively. Pipe terminations 23 and 24 are secured to said inlet and outlet threads 21 and 22, respectively. Water feeding line 25 is connected to pipe termination 23 and provides a flow of water into conduit 20 which activates spider turbine assembly 30 by hitting blades 31 which makes said assembly turn in the direction of arrow A. Spider turbine assembly 30 comprises a cylindrical armature 32 to which said blades 31 are attached to one end and the other being attached to shaft 33 which is journalled in end bushing 34 and rests on ball bearing 35 thereby allowing said shaft 33 to rotate with minimum friction. The water flow pressure against blades 31 is transmitted to shaft 33 which is ultimately transmitted to ball bearing 35. Shaft 33 is kept in place by middle bushing 36 and front bushing 37. All three bushings are made out of Teflon in the preferred embodiment, but any other suitable insulating material may also be used. Teflon is a registered trademark of the E. I. DuPont de Nemours Company of Wilmington, Del. Ferromagnetic rods 38 and 39 are rigidly secured to pipe terminations 23 and 24, respectively, on one end. The other end of rod 38 is provided with a cylindrical concentric recess 40 in which front bushing 37 is inserted and secured in place by contact pressure. A clearance 41 is kept between shaft 33 and front bushing 37 to facilitate rotation of the first one. The other end of rod 39 is provided with a cylindrical concentric recess 42 somewhat deeper than recess 40 designed to accomodate end bushing 34 and middle bushing 36.

Coils 50 and 60 are fed through D.C. inputs 70 and create the fields represented with lines referenced with the letters K, L, M and N. In the preferred embodiment a full wave rectifier has been connected to the line voltage (110 v. AC) with an unfiltered pulsating output voltage. As it can be observed, the magnetic field created by coil 50 will take the path represented by lines M and N which using the right hand rule will have the direction represented by the arrow heads. This magnetic field will be following the path of least reluctance in which ferromagnetic rod 39 will be acting as the core and the field then is forced to cross the gap between ferromagnetic rod 39 and ferromagnetic yoke 75. This gap has a higher reluctance because it is composed of the flowing liquid, and conduit 20. Fields M and N go through yoke 75 and into cylindrical cover 80 and then into end plate 90 and back through conduit 20 and the flowing liquid to reach rod 39. The field lines are cut by armature 32 to produce the electric field with the polarity shown with the plus and minus signs using the right hand rule. A similar field path is experienced with lines K and L. In essense, what we have is a homopolar generator which is characterized by providing a relatively high current with a low voltage. See Standard Handbook for Electrical Engineers, Eleventh Edition, Donald G. Fink, page 8-40 and 8-41, McGraw Hill Book Company; also Electricity and Magnetism, International Edition, Oleg D. Jefimenko, Appleton-Century Crafts Educational Division, Meredith Corporation, New York.

The operation of the reactor 10, is basically similar to a homopolar generator in which an electric field is created on armature 32, as shown in FIG. 1, and the current of this electric field travels from the front end of said iron armature 32 to its back end through the flowing water as the electrolyte produces an electrochemical reaction in which the iron oxide on armature 32 is reduced to ferrous oxide, Fe O. It is known that the black and brown synthetic iron oxides have the general chemical formula Fe O Fe$_2$O$_3$. The ferrous oxide constituent Fe O, is present in amounts varying from a trace to approximately 22%. When 19% to 22% Fe O is present, the resulting black iron oxide is often called synthetic magnetite. This form of iron oxide displays the familiar ferromagnetic properties. Smaller percentages of Fe O result in iron oxide characterized by various shades of brown. Both black and brown oxides are obtained by precipitating ferrous hydroxide. See Chemical and Process Technology Encyclopedia, Douglas M. Considine, McGraw-Hill Book Company, New York.

In the present invention the ferrous ferric oxide is electrogenerated formed by the reaction on iron armature 32. The ferrous oxide produced acts as particulate seeds to induce bulk precipitation of cations when the flowing water enters a heat transfer element such as a boiler, distiller, heat exchanger, etc. The ferrous ferric oxide then prevents the scaling of said heat transfer surfaces since this oxide has the characteristic of competing in providing a suitable surface for deposition of cations.

Furthermore, this ferrous ferric oxide provides a protective film on the heat transfer surfaces that prevents its corrosion.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. A magneto electrochemical reactor device to be used as a fluid conditioner for water treatment to prevent scaling and corrosion of heat transfer surfaces, comprising:
   (a) a non-magnetic conduit having an inlet and an outlet, and
   (b) a hydromagnetic homopolar generator having a cylindrical iron armature secured to a centrally disposed shaft through a plurality of spider legs adapted to rotate as the fluid flows through said conduit further including a pair of ferrous rods with terminations at the inlet and outlet of the conduit holding said shaft in place through insulated bushing means and means for creating a magnetic field perpendicular to said armature including a ferromagnetic yoke separated from said rods thereby forming a gap through which the resultant magnetic field is directed and concentrated so that sufficient electric current is induced in said armature to electrolytically produce ferrous ferric oxides capable of providing a protective film on said heat transfer surfaces.

2. The device set forth in claim 1 wherein said shaft is connected to external motor means so that it may be rotated independently from the flow rate of fluid through said conduit.

* * * * *